Patented Feb. 27, 1940

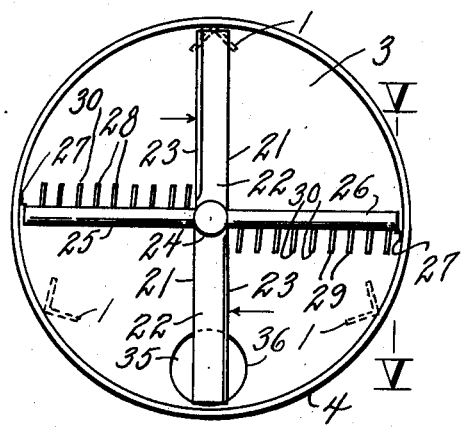

2,191,830

UNITED STATES PATENT OFFICE 2,191,830

MIXING APPARATUS

John S. Leedy, Adrian, Mich.

Application September 18, 1939, Serial No. 295,366

1 Claim. (Cl. 259—107)

This invention relates to working by the stirring of particles to effect a homogeneous commingling thereof.

This invention has utility when incorporated in a vat or tub having a lifting and tumbling promoting scraper or blade to work against a retarding comb, with features of efficiency in construction operation and sanitary upkeep.

Referring to the drawing:

Fig. 1 is a plan view of an embodiment of the invention, especially adapted to commingle particles or substances, even of widely differing degrees of moisture content or adhesive properties;

Fig. 2 is a side elevation of the apparatus of Fig. 1, with parts broken away to show the moving parts and features of the drive therefor;

Fig. 3 is a bottom plan view of the apparatus of Fig. 1, with parts broken away, showing the mounting for the bottom closure and the drive;

Fig. 4 is a view from the line IV—IV, Fig. 3, showing the holding means and control for the bottom closure; and Fig. 5 is a view of the blade and comb from the line V—V, Fig. 1, the shaft being broken away, and the position of the other blade and comb portion being shown in dotted lines.

Angle bars 1 have weld anchorage means 2 with a bottom 3 for a cylindrical vessel 4, the side walls of which rise from the flat circular bottom 3.

Bolts 5, 6, mount a base frame 7 at the under side of the bottom 3. The base frame 7 carries an electric motor 8. This motor 8 has a shaft 9 connected by a flexible coupling 10 to a shaft 11 having thereon a worm 12 in a housing 13. The worm 12 is in mesh with a worm wheel 14.

The worm wheel 14 is fixed on a shaft 15 having a step bearing 16 in the housing 13. This vertical shaft 15 is located centrally of the vessel 4 and therebelow, and extends upward through a sleeve portion 17 of the frame below the bottom 3.

The shaft 15 as in the vessel 3, 4, has a spline 18 to key hub 20 for rotation therewith. From the hub 20 there extends radially a pair of blades. Each blade has a forward lower straight edge 21 slightly clear of and parallel to the bottom 3. This lower portion edge 21 of the blade thus approaches scraping position in normal operation. Receding and inclined upwardly from the edge 21, the blade has a lifting portion 22 which terminates at upper and rear edge 23, as a spill-off for the material as scooped from the bottom and which has a building-up windrow sort of formation. This accumulation as thus lifted and sliding to some extent on the blade, then tumbles from the edge 23, in promoting the stirring and mixing operations hereunder. The spline 18 permits the hub 20 with its associated blade, to be readily placed and removed from position as driven by the shaft 15.

The free upper end of the shaft 15 is in position to have placed thereon a loose cap 24, to be centered thereby, as there extends radially therefrom arms 25, 26, normally thrust to engage stops 27 on the inner side wall 4. This is a comb-carrying device centered by the shaft 15 and held from rotation by the stops 27. Depending forwardly and with slight sweep inwardly are fingers 28, 29, from the arms 25, 26. Lower tip portions 30 of the respective fingers 28, 29, desirably have a slight clearance above the edges 23 of the blades as relatively traveling therebelow. Nothwithstanding that the blades are radial, there is experienced a tendency for the material to be worked or urged thereby toward the wall 4. To some extent such tendency to travel toward the periphery of the vessel is neutralized by the inward inclination of the fingers.

The more or less balling tendency of the material as lifted and accumulating in advance of the blade, as it tends to hold with the blade, rides under the slight pitch forward of the fingers. As the extent of this riding into the fingers goes further, such material is to such extent directed inward. The close proximity of the ends 30 to the blade edges 23, materially detracts from carrying-along of the material by the blade, but the fingers, in their comb-like performance, rake the build-up of clods or balls to have such tumble off back of the blade and contribute materially to breaking up such clods or balls and thereby are factors in promoting rapid and homogeneous commingling. Some of the balls are broken up as they ride, or attempt to ride between the fingers, while others fracture in the tumble back from the blade. In practice, the mix seems to have a rate of travel in the circuit of the blade at about one fourth that of the speed of the blade. This is the experience when the product may be a sort of cut grain or mash, especially as desirable for poultry food.

Hereunder the ration may be quickly put into condition to appeal to the fowl. With milk, milk products, or even water, the crumbling or degree of stiffness for the mass may be quickly and economically worked out.

The under side of the bottom 3, in lieu of one of the bolts 6, may be supplied with a pivot pin 31, from which swings a radially extending arm 32 carrying an adjustable bolt 33 to vary the compression action of a spring 34 in a stirrup 34' engaging a closure disk 35, which in normal operation is in position as a closure for a bottom opening 36. This position is flush with the bottom and permits a swing of the arm 32 to shift this plate 35 in the region as limited by a guard 37. There is, accordingly, opportunity for ready sanitary cleaning of materials for the parts to operate in working the material out as the scraper and comb are effective, and as the material has been removed it is only necessary to lift the comb and then the scraper to remove the operating parts from the vessel for such further cleansing as may be in order.

What is claimed and it is desired to secure by Letters Patent is:

A cylindrical vessel having a bottom for supporting a charge of loose particles of material to be mixed and stirred, a shaft extending centrally through said bottom, a radially extending lifting blade rigidly mounted on the shaft concentrically of the vessel adjacent said bottom with a clear region thereover, a drive for effecting relative rotation between the blade and vessel bottom, and a stationary comb above said clear region, said comb retarding the rotation of the material by having a pitch downward and inward in the direction of the material travel and to a slight degree effecting pulling of the material away from circumferential accumulation in response to rotation by the blade when such material is forced upwardly across the radial clearway above the blade.

JOHN S. LEEDY.